United States Patent [19]
Matthews et al.

[11] Patent Number: 5,433,995
[45] Date of Patent: Jul. 18, 1995

[54] CARBON FIBER-REINFORCED COMPOSITE HEAT REFLECTORS

[75] Inventors: Linn H. Matthews, Dunwoody, Ga.; John M. Pike, Pleasantville, N.Y.

[73] Assignee: Amoco Corporation, Chicago, Ill.

[21] Appl. No.: 108,473

[22] Filed: Aug. 18, 1993

[51] Int. Cl.$^6$ ............................................. B05D 5/00
[52] U.S. Cl. .................................... 428/246; 428/252; 428/262; 428/263; 428/265; 428/408
[58] Field of Search ............... 428/408, 260, 262, 263, 428/265, 252, 246

[56] References Cited

U.S. PATENT DOCUMENTS

| | | | |
|---|---|---|---|
| 3,906,308 | 9/1975 | Amason | 317/2 E |
| 4,791,076 | 12/1988 | Legett | 501/95 |

*Primary Examiner*—Christopher W. Raimund
*Attorney, Agent, or Firm*—Richard J. Schlott; Stephen L. Hensley

[57] ABSTRACT

The improved infrared source comprises a fiber-reinforced resin matrix composite having low infrared surface reflectivity and a quarter-wave optical coating on a surface of the composite to increase the reflectivity in a portion of the infrared and provide the surface with dichroic reflection characteristics.

6 Claims, 2 Drawing Sheets

Fig. 1

REFLECTANCE vs MICRONS (3–24)

Fig. 2

REFLECTANCE vs MICRONS (3–24)

CARBON FIBER-REINFORCED COMPOSITE HEAT REFLECTORS

BACKGROUND OF THE INVENTION

This invention relates to fiber-reinforced composites, and more particularly to fiber-reinforced composites having enhanced surface reflectivity, which may be useful as infrared reflectors having dichroic reflection characteristics. The reflectors may be particularly useful in applications where it is desired to maximize radiant energy output at particular wavelengths, selectively improving heat transfer.

All bodies at a temperature above absolute zero radiate energy. For most bodies at moderate temperatures, the energy radiated falls in the infrared region of the electromagnetic energy spectrum and is commonly called radiant heat. At temperatures where the energy source becomes luminous, the energy output will include the visible portion of the spectrum as well. Active radiant heat sources are readily available and are in wide use. The familiar stem- or fluid-heated radiator may be classified as a dull or low temperature source of radiant energy, as are a great many other widely used heat sources, for example, resistance heaters, radiant heat panels, ceramic-walled space heaters and the like. High temperature or bright energy sources such as ordinary incandescent lamps, vitreous quartz glowbars, electrical resistance elements, halogen lamps, certain forms of industrial lasers and even focussed sunlight are also well known and widely used.

Transfer of energy by radiant means occurs over distances, even in a vacuum. Unless an object is perfectly transparent, a portion of all of the radiant energy incident upon a surface will be absorbed, and a portion reflected. A highly reflective surface will reflect substantially all of the incident radiation, absorbing little energy. Reflectivity of a surface varies with the wavelength of the incident radiation; that is, a surface does not absorb energy equally at all wavelengths. Most non-metallic materials are good absorbers over much of the infrared portion of the spectrum, and many organic materials have principle absorption bands at wavelengths in the portion from about 2 to about 5.5 $\mu$m, a band termed by some references the thermal heating band. Radiant heat sources intended for use in toasting or browning are selected to provide a high-energy flux in this portion of the spectrum. In addition, since water and carbon dioxide also absorb strongly at wavelength bands within this region, substances containing high levels of water, for example, latex films, moist solids and the like, may be efficiently dried by using radiant energy in this wavelength region as a means for heating.

Design of radiant heating devices is generally directed toward providing maximum energy output in the thermal region of the energy spectrum in order to use power efficiently. For example, in U.S. Pat. No. 5,157,239 there is described an oven with a grill chamber employing a plurality of halogen lamps as energy sources. At least one of the lamps is provided with a coating selected to reduce the energy output in the visible portion of the spectrum while transmitting the radiant energy output of the lamp in the infrared region. Each source is independently operable, permitting control of the ratio of energy output in the infrared and the visible regions of the spectrum. Radiant energy sources with enhanced output in the thermal infrared regions and at even longer wavelengths are also available. In U.S. Pat. No. 5,077,061 there is described a ceramic heating element capable of efficiently radiating energy at wavelengths of from 3 to 50 $\mu$m. These and similar sources provide further opportunity for improving the efficiency of radiant heating devices.

Combining convective heat transfer with radiant heat transfer has been found useful in further improving the efficiency of radiant heat appliances. Although dry air does not absorb significant energy by radiant heat transfer, like other fluids it may absorb heat through direct contact of the air molecules with a heated surface. In convective heat transfer, air flowing over a hotter surface will become heated, and will convey heat to cooler surfaces. A great variety of radiant heating appliances in common use employ a combination of radiant and convective heat transfer modes for space heating. Combined modes of heat transfer are also widely used in processing equipment including baking ovens, driers and the like to improve the efficiency and reduce power consumption. For example, in U.S. Pat. No. 4,333,003 there is disclosed the use of convective air flow over the radiant heat source to improve delivery of heat energy to the surface of a web of material to be dried, or to the surface of a conveyer belt used to carry material through the oven for heat treatment.

Radiant heaters are employed in baking, in the drying of paints or the like, in grilling foods and in space heating. Where a radiant heating device is intended for use in drying or heat-treating a specific substrate, a heat source having enhanced output at particular wavelengths where the substrate absorbs energy may improve the efficiency of the device. In U.S. Pat. No. 5,073,698 there is described a method and apparatus for selectively heating a film on a substrate by providing radiant energy in a band of wavelengths selected to be efficiently absorbed by the film and not by the substrate or carrier. The source of energy is disclosed as a xenon lamp having maximum intensity output in the range 0.8–1.2 $\mu$m. According to patentees, matching the wavelength of the energy output to the absorption characteristics of the film reduces or avoids wasting power by not generating energy at wavelengths that are absorbed inefficiently or not at all.

The principle of matching the radiant heat source to the task may be similarly used to improve the design of driers or the like. Water vapor and carbon dioxide absorb energy principally at wavelengths of 2.5–2.8 $\mu$m, 4.1–4.5 $\mu$m and 5.6–7.6 $\mu$m. Sources that radiate energy in those regions may be used to improve the efficiency of equipment used in drying or curing latex films and similar water-containing substrates. Convective air flow devices wherein humid air comprising a normal level of carbon dioxide is heated may also benefit by use of such radiant energy sources. Sources of monochromatic radiation are known. For example, lasers have been used to provide high levels of energy at a very specific wavelength. To be effective, a monochromatic source must be selected carefully to have an output that closely matches the principle energy absorption band that is characteristic of the substrate. Absorption characteristics vary with substrate temperature and with the angle of incidence, and may also be altered by the presence of a surface film and by changes in the composition of the substrate. Lasers are therefore not preferred for general use.

Sources with energy output restricted to a narrow band of wave lengths are also known and these may be more useful as energy sources in heating devices. For example, the device disclosed in U.S. Pat. No. 5,073,698 employs a source that radiates over the narrow range of from 0.8 μm to 1.2 μm, a band selected to be particularly useful for thermal treatment of particular silicon and silicon alloy substrates. Radiant heating devices that will be used with substrates that differ significantly in absorption characteristics may require a plurality of narrow band radiant energy sources, increasing costs and reducing efficiency.

Polychromatic sources radiate a broad band of wavelengths, and may be particularly selected to have a maximum output within a specific region of the energy spectrum. For example, sources are available that radiate over a broad portion of the infrared, from 3 to 50 μm as shown in U.S. Pat. No. 5,077,061. These find wide acceptance for use in devices intended for heating a variety of substrates under a wide range of conditions. However, polychromatic radiant energy sources also suffer disadvantages. Characteristically, a relatively small fraction of the total energy spectrum of such broad band sources falls within one or more of the principle absorption bands characteristic of a particular substrate. A significant portion of the energy output is not efficiently utilized in thermally treating the substrate. Power utilization will therefore be inefficient.

Means for providing a better match between the output spectrum of the source and the absorption spectrum of the substrate that will be heat-treated are needed to effectively improve heat transfer and thereby shorten the time required to carry out the treatment, reducing power usage. For example, where the device will be employed for removing moisture from substrates, augmenting the level of radiation produced in the principle absorption bands associated with water may improve drying efficiency, while improved output within the energy bands characteristic of water and of carbon dioxide could improve radiant heat transfer to moist air and thereby improve the efficiency of devices employing convective air, such as space heaters and the like.

SUMMARY OF THE INVENTION

This invention is directed to a fiber-reinforced composite structure having improved surface reflectivity in the infrared, and more particularly to a fiber-reinforced composite comprising a fiber-reinforcement embedded in a resin matrix, said composite coated on at least one surface with a thin dielectric layer. The invention may also be characterized as an improved infrared source designed to operate at temperatures up to about 500° F. comprising a fiber-reinforced composite having a thin, infrared-transparent dielectric film or coating deposited on at least one surface. The thin optical coating may significantly improve the surface reflectivity of the composite at pre-selected wavelengths in the infrared, giving the composite surface dichroic reflection characteristics.

The coated composite of this invention may be used as a dichroic infrared reflector for a selected band of wavelengths as determined by the optical coating. When heated, the coated composite may also function as an active source of infrared radiation within pre-selected wavelength bands.

BRIEF DESCRIPTION OF THE DRAWINGS

FIG. 1 is a graphic presentation of the specular reflectance data for the uncoated side of the carbon fiber-reinforced composite panel designated as Sample A.

FIG. 2 is a graphic presentation of the specular reflectance data for the coated side of the carbon fiber-reinforced composite panel designated as Sample A.

DETAILED DESCRIPTION OF THE PREFERRED EMBODIMENTS

Figure 3:
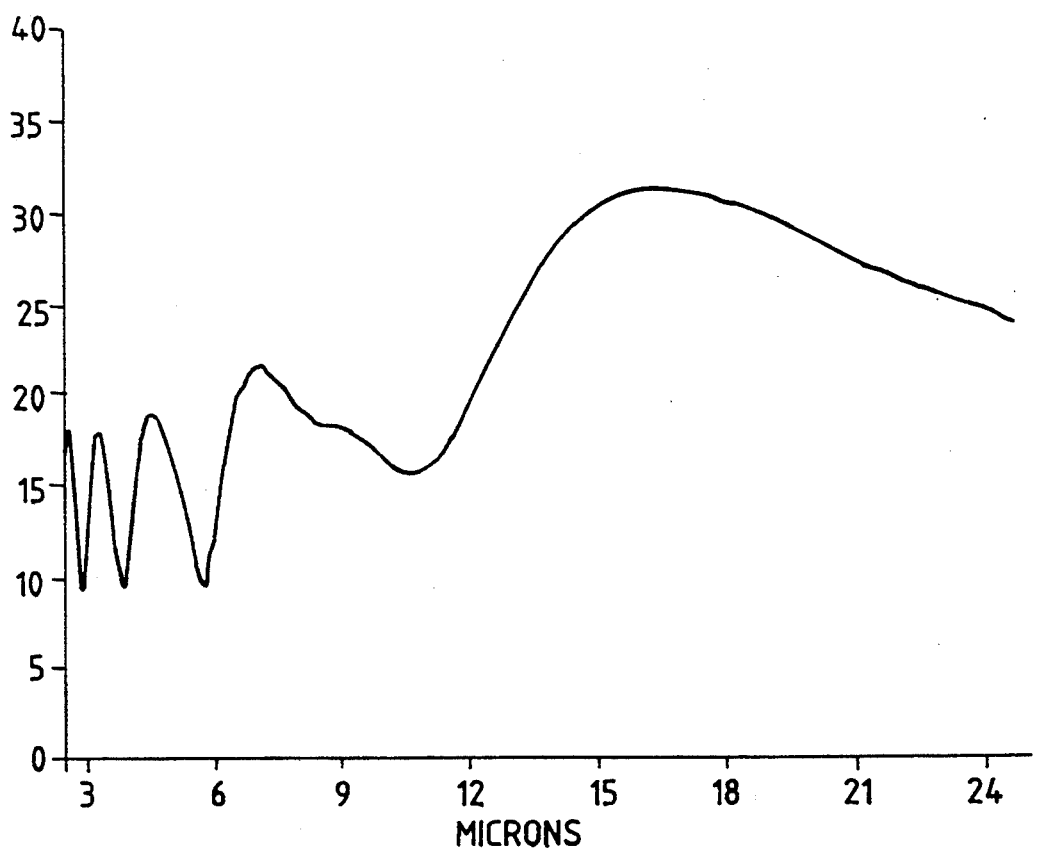
FIG. 3 is a graphic presentation of the specular reflectance data for the coated side of the carbon fiber-reinforced composite panel designated as Sample B.

The fiber-reinforced composite structure of this invention comprises a fiber-reinforced resin matrix composite having low surface reflectivity in the infrared and an optical coating on at least one surface of said composite to modify the surface reflectivity at pre-determined wavelengths in the infrared.

Dichroic reflective means may be used to select a particular energy band from the output of a polychromatic radiant energy source. Though dichroism originally referred to color separation, as currently understood and used in the art, the term has come to be applied to the entire electromagnetic energy spectrum to denote separating a certain portion of the spectrum from the total spectrum. Generally, a dichroic reflector will be understood to reflect incident radiation in a selected band of wavelengths, the balance of the incident energy at other wavelengths being absorbed by the substrate, or transmitted if the substrate is transparent.

Radiant heating devices generally include reflectors placed to direct the output of the energy source toward the article or substrate intended to be heated. In addition, interior surfaces of such devices are often made highly reflective, both to protect the device walls and to reduce energy losses. Most such reflectors are commonly constructed of metal or of a heat-resistant material having a metallized or metallic foil reflective surface. Conductive materials, e.g. metals, will generally be broad band reflectors, that is, be capable of reflecting energy efficiently over a wide portion of the spectrum.

As is well understood in the optical arts, a surface having high reflectivity at some wavelength, or band of wavelengths, will exhibit low emittance at that same wavelength, or band of wavelengths. The emittance of a smooth surface formed of polished metals or metallic solids may be considerably below 0.1, while the emittance of a solid nonconductor in the infrared region will generally be above 0.7. Modifying the reflectivity of surfaces formed of good conductors such as metals by further reducing the already very low emittance will therefore be difficult. Non-metallic and substantially nonconductive materials that are opaque and exhibit high emittance, preferably with an emittance above about 0.7, at wavelengths from about 0.8 to about 50 μm, will thus be more suited for the purposes of this invention. The material will also be selected to withstand the temperatures that may be encountered in use. For example, where the device will be employed as an active thermal radiator, the material will necessarily be capable of withstanding elevated temperatures, generally as high as 500° F. or higher without significant loss in strength and without becoming distorted by warping or flow.

A variety of heat resistant, nonconductive materials including glass and ceramics, carbon structures such as graphite, and refractory materials such as vitreous silica, fire brick and the like, are available for use where extreme temperatures may be encountered. However, many such materials when reasonably smooth are fairly good reflectors of thermal energy and some are somewhat transparent in the infrared portion of the spectrum. In addition, some are too brittle or lack the strength necessary for use in applications where they may be subject to severe physical stress or possibly to abusive environmental exposure.

Synthetic resins, preferably thermoset resins, are nonconductive solids and most are good absorbers of infrared. Though many of these resins may be directly fabricated into substrates useful in the practice of this invention, preferably the resins will be combined with filler or structural fiber. When fiber-reinforced, the resins form composite materials with excellent mechanical properties including rigidity and high strength that are well suited for use at elevated temperatures and in extreme environments. Particularly useful for these purposes are filled and fiber-reinforced epoxy resins, cyanate ester resins, bismaleimide resins and the like. Extreme high-temperature performance thermoplastics including polyimides, polyamide-imides, polyarylene ethers and the like, may also be useful, both in neat resin form and when fiber-reinforced, and structures comprising amorphous carbon or graphite as the matrix component may also find application as substrates. Where the matrix resin is appropriately selected, such composites will retain useful properties to temperatures well above 500° F. for extended periods of time without deterioration.

Fiber-reinforced composites, further described as comprising structural fiber embedded in a matrix such as a thermoset resin or an amorphous carbon, are well known. Such composites have found wide commercial acceptance, for example, for use in automotive components, in structural applications, as aircraft panels, as heat sinks in electronic equipment and the like. A great many methods for preparing such composite materials are well known in the an and most may be readily adapted for producing the composite substrates for use in the practice of this invention. For example, structural fiber such as continuous carbon or glass fiber in the form of yarn, tape, tow or fabric, may be impregnated with a matrix resin in uncured form, wound or laid up to form a layered structure and then cured. Methods for fabricating reinforced carbon matrix composites are also known, including impregnating a carbon fiber preform with amorphous carbon or impregnating with a carbon precursor such as pitch and then firing the structure to carbonize the precursor.

The dielectric properties of such composites will vary with the nature of the fiber component and the matrix resin component. As is known in the art, carbon and graphite are electrically conductive, particularly when the level of crystallinity is high. Where the substrate will be a fiber-reinforced composite, and particularly where the structural fiber is carbon fiber, the matrix component selected will preferably be a resin with good dielectric properties. Fabricating the composite to ensure a resin-rich surface for application of the coating may further aid in reducing surface conductivity where desired. A variety of structural composite materials are known for use in demanding applications including aircraft panels and structural components, and these may be employed in the practice of this invention. Particularly desirable are composite materials based on bismaleimide matrix resins. Representative bismaleimide formulations, together with fiber-reinforced composites comprising such formulations, are disclosed and described in U.S. Pat. Nos. 4,654,407 and in U.S. Pat. No. 4,774,282. Also useful in the manufacture of high-performance composites are epoxy matrix resin formulations such as those described in U.S. Pat. No. 4,517,321. However, carbon fiber-reinforced epoxy resins are somewhat more electrically-conductive, and will be less preferred for use in the practice of this invention. Fiber-reinforced composites comprising glass or carbon fiber embedded in a high-temperature thermoplastic such as a polyimide, polyphenylene oxide, polyphenylene sulfide, polyamide-imide or the like, are also well known, and composites such as those disclosed in U.S. Pat. Nos. 4,775,556 and 5,132,394 may also find use in composites for particular applications according to the practice of the invention.

A fiber-reinforced resin composite having the desired shape will be fabricated using conventional methods widely employed in the an for producing fully-cured composite structures, and then provided with an optical coating on at least one surface. The coating material will be transparent to infrared at the intended operating temperatures over at least the wavelength range of interest for the intended use, and preferably over substantially the entire range of from 0.8 to about 50 $\mu$m. Coating materials transparent in the range of about 1.5 $\mu$m to 20 $\mu$m will be suitable for most uses, while coating materials with a transparency in a narrower band, such as from 2.5 to about 14 $\mu$m or even narrower, may be useful for particular applications. The coating material will also be selected to have a refractive index in the infrared greater than that of the substrate, preferably above about 3.0 and more preferably above about 4.0.

As is well known in the optical arts, a thin layer of a transparent dielectric deposited on a substrate at an appropriate thickness and having a higher refractive index than the substrate will behave as an interference filter, reducing emittance of the surface and thus increasing the surface reflectivity by constructive interference at particular wavelengths of incident light. To be effective at a particular wavelength, the optical thickness of the layer, which is the product of the physical thickness and the refractive index of the coating material, will be one quarter of the wavelength reflected, providing what is commonly termed a quarter wave coating. The filter will also be effective at odd multiples, the so-called odd interference orders, of the selected radiation frequency, i.e. at wavelengths approximately $\frac{1}{3}$, 1/5, etc. that of the selected wavelength, as may be determined mathematically according to well-known optical theory. The physical thickness of the film will thus be a function of the refractive index of the coating material and the wavelength selected as the center of the band of wavelengths to be reflected, and those skilled in the optical arts will readily understand and be familiar with the methods for calculating the particular physical thickness to be employed.

Generally, for use as an interference filter in the infrared, the film optical thickness will lie preferably in the range of from about 1 to about 8 $\mu$m. The corresponding physical thickness of the film for coating materials having a refractive index in the IR greater than a composite substrate will lie generally in the range of from about 0.5 $\mu$m to about 4 $\mu$m, and more preferably from about 0.5 to about 2 $\mu$m where the coating materials have a refractive index above 4. The effectiveness of the interference filter may be improved greatly by employing a plurality of film layers. Where more than one layer is employed, the films will preferably be selected to have varying combinations of refractive index and optical thickness to provide more effective control of cut-off frequency, a practice known in the optical art as squaring off the band pass characteristic of the filter.

Dielectric substances that are transparent in the infrared portion of the spectrum with the necessary high-refractive index value are known, and include both semiconductors and insulators. For example, methods for depositing thin optical films of C (diamond), Si and Ge, as well as compounds including InSb, GaSb, InAs, $Te_3AsSe_3$, InP, GaAs, GaP, PbTe, $C_3N_4$ and the like, are well known in the art. Inasmuch as the coating will be applied to a dissimilar substrate, it will also be necessary to select the coating material to withstand thermal cycling without flaking. Preferably, the coating material will be selected to have a coefficient of thermal expansion close to or matching that of the substrate, a value of from about 1.2–2.0 $\mu$-strain/°C. for fiber-reinforced composites. Coating materials that are particularly oxidation resistant or capable of forming a coating with a high-surface hardness, as high as a microhardness of $2000N/mm^2$ and higher, may be particularly desired for use in extreme environments to resist erosion or abrasion and other damage. Physical protection of the film may also be accomplished for some applications by providing a sacrificial overcoating of a suitable low-index, IR-transparent substance such as MgO, $BaF_2$, Yttralox, $BaTiO_3$, fluorite or the like. The optical thickness of the overcoat would be selected to match the dichroic range of interest.

Thin films of dielectric materials are readily deposited at optical thicknesses on a wide variety of substrates including glass, ceramic, graphite and the like, using methods that are well known in the optical arts. Low-temperature processes have been developed for depositing such coatings on heat-sensitive substrates, for example plastics, resin matrix composites and similar organic materials, including vacuum vapor deposition and sputtering techniques, and numerous commercial laboratories and optical supply houses now offer such processing as a commercial service. Any convenient method capable of controllably coating such substrates with a thin dielectric film without damage may be used in producing coated composite structures according to the invention.

The coated composite structure of this invention may conveniently be employed as a dichroic reflector. In such applications, the composite structure will be placed to reflect incident radiation from a polychromatic source at the coated surface. The optical thickness of the quarter wave coating will be selected to increase the reflectivity of the coated surface at wavelengths in the range of greatest benefit to the task. For example, many radiant heat devices are employed as driers, serving to remove water from wet films or moist materials. For use in such devices, the dichroic reflector coating thickness would be selected to provide high reflectivity in the spectral region associated with the primary absorption bands of water. An appropriately-disposed flat or curved composite structure having such a coating on one surface would thus reflect that portion of the incident radiation toward the wet material, aiding in the drying process.

The unreflected balance of the incident radiation would be absorbed by the composite surface, thus heating the reflector. In a device employing a combination of radiant and convective heat transfer modes, the heated reflector body would be contacted by the convective heat transfer medium, such as air. The coated composite structure of this invention would thus absorb the portion of the radiant energy at wavelengths that are poorly absorbed by a wet substrate, and use the energy more effectively in aid of convective heat transfer.

Devices employing convective air may be further improved by providing those surfaces of the reflector body employed as fluid heat transfer surfaces with a coating selected to allow maximum emittance in the spectral bands associated with the primary absorption bands of moist air, and reduce the emittance in other regions of the spectrum. The coating would reduce the radiant heat loss from the reflector body, further improving the transfer of heat in the convective mode. In addition, the heat transfer to the convective air may be enhanced by the radiant heat transfer component at the wavelengths absorbed by moist air.

Dichroic reflectors constructed from coated composites according to this invention may thus be employed to improve the efficiency of driers and other such radiant heaters by utilizing the portion of the infrared radiation less readily absorbed by the moist substrate for convective heat transfer. Combinations of dichroic reflectors and polychromatic radiant heat sources could find use in a variety of heating devices employing radiant heating and convective airflow, including those described in U.S. Pat. No. 4,333,003 as well as the great variety of drying ovens and space heaters in common use.

Composite reflectors of this invention may also find use as light-weight, strong, high-strength wall panels for the interiors of low-temperature radiant ovens, space heaters, dryers and similar structures employing radiant heat sources. Such components are ordinarily formed of metals and given a smooth, even polished, heat-reflective surface. Fiber-reinforced composite panels, if coated at an optical thickness selected to reflect a substantial portion of the incident radiant energy, would reduce heat loss and undergo only minimal heating. Such composite reflectors may be particularly attractive for use as metal replacements in radiant heat devices where weight is a consideration.

The coated fiber-reinforced composites of this invention may also be used to provide structures designed to be heated to an elevated operating temperature, thereby serving as active infrared sources. For example, the composite structure may be designed with internal tubing or channels for circulating a suitable heat transfer fluid such as heated air, or a solid composite structure could be conductively heated by contacting a heat source such as a heated block, a furnace or the like. Alternatively the passage of electrical current through conductive carbon fiber has been employed in the an to heat radiant heating panels, heating pads and the like. In similar fashion, electrical heating of non-metallic tooling comprising carbon fiber has been employed in the aerospace industry for curing composite structures. A fiber-reinforced composite panel or other article coated according to this invention may be designed to be similarly heated by passage of electric current.

For use as an infrared heat source, the coated composite would be heated to an operating temperature below luminosity, generally below about 500° F., and would radiate infrared energy within pre-selected spectral bands, determined by the quarterwave optical coating. The composite coating will have an optical thickness selected to increase the surface reflectivity at the operating temperature in a band or bands of wavelengths that exclude the spectral band or bands where the heat source is intended to radiate, leaving the surface reflectivity in the desired wavelength band substantially unaffected.

The wavelength corresponding to the peak energy output for a black body at the operating temperature may be determined by Wein's law. Preferably, the optical thickness of the coating will be optimized at a wavelength of 1.4 times the peak wavelength, providing low emittance and thereby high reflectivity for a spectral band that substantially encompasses the central 50% of the radiant energy output of the heated composite at the operating temperature.

The output of infrared radiation will be desirably high in spectral regions where the coated surface has high emittance, which will be selected to be useful in accomplishing the intended task, for example, the wavelength bands best absorbed by water for use in a drying operation or at wavelengths best absorbed by moist air for use in convective heat transfer using air. The balance of the available energy would not be radiated, and would therefore be retained by the structure, thus reducing heat loss to the surroundings and maintaining the structure at the desired operating temperature more efficiently. As with the heated reflector body described herein above, the radiant energy output of the composite infrared source would thus be restricted to the most useful portion of the spectrum, and the overall efficiency of the device would be improved. Similar principles may be used to design coated composite panels according to the invention for use in dissipating unwanted heat, particularly to surrounding air.

The invention will be better understood by consideration of the following description of certain specific embodiments thereof, which are provided by way of illustration and are not intended to be limiting.

EXAMPLES

A carbon fiber-reinforced bismaleimide resin laminate was prepared by impregnating fabric woven from carbon fiber obtained as Thomel ® PAN-based carbon fiber, T-300 grade, from Amoco Performance Products, Inc. A bismaleimide resin formulation made up according to U.S. Pat. No. 4,654,407 and coated on release paper to provide a film may be used in a conventional process for making impregnated fabric. The fabric prepreg, containing approximately 32 wt % resin, will then be laid up as a 10-ply, quasiisotropic laminate panel and cured by heating at 180° C. in an autoclave for four hours, then at 250° C. in a forced air oven for four hours. The composite or laminate employed in the following examples had a thickness of 0.125", with a smooth, resin-rich surface with no exposed fiber. The composite was cut into test panels 1.5"×1.25" for coating.

The panels were dried and outgassed prior to coating by heating at 110° C. in a vacuum oven overnight, then placed in a vacuum chamber and coated on one face with germanium. Two sets of test panels were prepared. The first, designated Sample A, was given a thin coating, nominal thickness 0.62 $\mu$m. The second set, designated Sample B, was given a thicker coating, nominal thickness 1.2 $\mu$m. The panel coatings were all given a protective overcoating of silicon nitride at a nominal thickness of 0.03 $\mu$m. Witness coupons, 1"×3" glass slides, were included in the runs. The slides were masked on half of the coating surface to provide specimens for determining coating thickness by optical means. One of the two glass specimens prepared in each run was further coated by sputtering with aluminum.

The coating thickness was determined for each composite panel by physical means. Six determinations were averaged for each panel:

Sample A panels had a physical coating thickness of 0.6932 $\mu$m

Sample B panels had a physical coating thickness of 1.3783 $\mu$m

Basic spectral data were obtained for the coated face and for the uncoated reverse face of each composite panel. A Mattson Polaris Fourier Transform IR spectrometer was used, adapted for precision reflectance determinations. All measurements were made with a 0.25" diameter light spot, at an angle of incidence of 15° off-normal, ensuring effectively normal incidence illumination. Reference data were obtained for calibration using mirror aluminum having R=98% in the region of interest.

The coating thickness determined by optical means for the glass witness coupon coated with Sample A was 0.70 $\mu$m, in good agreement with the physical determination. The coating thickness determined by optical means for the glass witness coupon coated with Sample B was 1.41 $\mu$m, again in good agreement with the physical determination.

For Composite A, the reflectance minima found corresponding to interference orders 2 and 4, and the maximum for interference order 3, were used provide wavelength values for determining optical thickness of the germanium coating on the panel as 2.84 $\mu$m, assuming the germanium coating has a refractive index value of 4.0. The optical thickness corresponds to a physical thickness of 0.71 $\mu$m.

For Composite B, the reflectance minima found corresponding to interference orders 2, 4, 6 and 8 and the maxima for interference orders 3, 5 and 7 were used provide wavelength values for determining optical thickness of the germanium coating on the panel as 5.61 $\mu$m, again assuming the germanium coating has a refractive index value of 4.0. The optical thickness corresponds to a physical thickness of 1.41 $\mu$m.

Turning now to the Figures: The infrared specular reflectance spectral data from 3 to 25 $\mu$m for the uncoated side of the Sample A panel are presented graphically in FIG. 1. The low-surface reflectivity, less than 10%, at shorter wavelengths will be apparent. The increase at longer wavelengths to reflectances above 20% indicates the composite surface may be somewhat electrically-conductive.

The infrared specular reflectance spectral data from 3 to 25 $\mu$m for the coated surface of Sample A are presented graphically in FIG. 2. The quarter-wave germanium coating, having an optical thickness of 2.84, will be seen to succeed in maximizing the reflectance of the composite surface at the first order wavelength of 11.36 $\mu$m to give a reflectance of about 32%, and again at order 3, that is at 3.73 $\mu$m, to give a reflectance of about 26%. The minima, occurring at 5.65 and 2.88 $\mu$m, give reflectances of about 8%, substantially the same as measured for the uncoated sample, FIG. 1.

The coated composite panel of Sample A is thus seen to be a dichroic reflector, with good reflectivity at wavelengths near 4 $\mu$m and about 9 $\mu$m. The reflectivity of the coated composite panel of Composite A is seen to be low at wavelengths near 5.65 and 2.88 μm, bands that closely correspond to the principle absorption bands of water, and would have high emittance in those bands. Composite panels and similar structures coated according to the invention may therefore find application as an infrared source for driers.

The infrared specular reflectance spectral data from 3 to 25 μm for the coated surface of Sample B are presented graphically in FIG. 2. The germanium coating, having an optical thickness of 5.61, will be seen to succeed in maximizing the reflectance of the composite surface at order 3, that is at about 7 μm to give a reflectance of about 23%, again at order 5, that is at about 4.5 μm, to give a reflectance of about 19%, and at order 7, that is at about 3.3 μm, to give a reflectance of about 19%. Low reflectivity is seen at about 10.7 μm and at the minima occurring at the even orders 4, 6 and 8, that is, at about 5.7, 3,8 and 2.9 m, where the reflectances of about 9% are again little changed from the values for the uncoated sample, FIG. 1. A broad, 30% reflectivity maximum found at about 17 μm, tapering with increasing wavelength, may be a further result of the effect of electrical conductivity of the composite surface on reflectivity.

Again, the low-surface reflectivity and corresponding high emittance seen for Sample B at wavelengths associated with the principle absorption bands of water suggest use of such coated composites as an infrared source for use in drier applications.

The surface emittance of the coated composite panels was also determined. Measurements were made at 110° C.±2° C. over the mid-infrared range of 8–14 μm using a two-chamber absolute emissometer, fitted with resistance heaters for heating the test specimen and blackbody reference chambers, and a pyrolytic detector for measuring IR emission. The operation of the instrument is checked by measurement of known references, including a known IR black coating and an aluminum sheet of known emittance.

The emittance for coated Sample A panel, averaged over 8–14 μm, was 0.45; a second coated composite panel sample of the Sample A set had an emittance of 0.53. The uncoated faces had emittances of 0.75 and 0.73. The presence of the coating thus reduced the average emittance of the composite surface over the measured range of wavelengths by 34%, which is a significant change.

The emittance for coated Sample B panel was 0.63; a second panel sample had an emittance of 0.65. The uncoated faces had emittances of 0.73. The thicker coating employed for Sample B provided a lesser reduction in the average emittance of the composite surface, about 12%, again a significant reduction.

It thus will be apparent that the presence of the dielectric thin film coating on the surface of a fiber-reinforced composite as taught herein significantly increases surface reflectivity of the composite, and reduces surface emittance at elevated temperatures. Applying a plurality of alternating thick and thin layers and employing coating materials with different refractive indices would afford substantial further control over the reflectivity and emittance of such composite structures within narrowly-defined spectral bands.

The invention has been described and illustrated by way of specific embodiments set forth herein, and more particularly as a composite structure comprising structural fiber embedded in a resin matrix having deposited on at least one surface a thin film of a dielectric having a refractive index in the infrared greater than the composite. The preferred structures comprise a carbon fiber-reinforced resin matrix laminate having deposited on at least one surface a coating comprising one or more thin layers of a dielectric coating material selected from C (diamond), Si and Ge and compounds including InSb, GaSb, InAs, $Te_3AsSe_3$, InP, GaAs, GaP, PbTe, $C_3N_4$ and the like. The optical thickness of the thin layers of dielectric will lie preferably in the range of from about 1 to about 8 μm. The composite structures and similar articles coated according to this invention are particularly useful as dichroic heat reflectors and may find use as infrared radiators, for example, in radiant space heaters, driers and the like. The coated composites may also find application in the form of structural panels and outer skins for use where improved heat dissipation is needed, particularly by radiant means at wavelengths best suited for heat transfer to the surrounding air.

Still further modifications and variations will also be apparent to those skilled in the fiber and composite fabricating arts and such variations and modifications will be included within the scope of the invention as defined by the appended claims.

We claim:

1. A composite structure comprising continuous structural fiber embedded in a resin matrix, said structure having deposited on at least one surface thereof a coating comprising a thin film having an optical thickness in the range of from about 1 to about 8 μm and formed of a solid dielectric substance transparent in the infrared and having a refractive index greater than the surface of said structure.

2. The structure of claim 1 wherein said coating comprises a plurality of said thin films.

3. The structure of claim 1 wherein said coating comprises at least one thin film layer having a physical thickness of from about 0.5 to about 6 μm.

4. The composite structure of claim 1 wherein said layer has an optical thickness of from about 2 to about 3 μm.

5. The structure of claim 1 wherein said coating includes a protective outer layer.

6. A composite structure comprising continuous carbon fiber-reinforcement embedded in a thermoset resin matrix and forming a layered composite, said structure having deposited on at least one surface thereof a coating comprising at least one layer of a solid dielectric substance having a refractive index in the infrared spectrum greater than 3, and an optical thickness of from about 1 to about 8 μm.

* * * * *